(12) United States Patent
Karri et al.

(10) Patent No.: US 12,508,853 B2
(45) Date of Patent: Dec. 30, 2025

(54) PROACTIVE COOLING SYSTEM (71) Applicant: INTERNATIONAL BUSINESS MACHINES CORPORATION

(72) Inventors: Venkata Vara Prasad Karri, Visakhapatnam (IN); Saraswathi Sailaja Perumalla, Visakhapatnam (IN); Sarbajit K. Rakshit, Kolkata (IN); Suresh Nagulakonda, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 17/449,106

(22) Filed: Sep. 28, 2021

(65) Prior Publication Data

US 2023/0102845 A1    Mar. 30, 2023

(51) Int. Cl.
*B60C 23/19* (2006.01)
*B60C 23/20* (2006.01)
(Continued)

(52) U.S. Cl.
CPC .............. *B60C 23/19* (2013.01); *B60C 23/20* (2013.01); *G01C 21/3461* (2013.01); *G01C 21/3605* (2013.01); *G06N 20/00* (2019.01)

(58) Field of Classification Search
CPC ........ B60C 23/19; B60C 23/20; G06N 20/00; G01C 21/3461; G01C 21/3605
(Continued)

(56) References Cited

U.S. PATENT DOCUMENTS 8,290,756 B2    10/2012 Fevrier
10,956,855 B1 *   3/2021 Coughran .............. G06N 20/10
(Continued)

FOREIGN PATENT DOCUMENTS

BR    102020017441 A2 *  8/2021 ........... B60C 11/243
CN    104842723 A    *  8/2015
(Continued)

OTHER PUBLICATIONS

"Extreme heat can cause tire blowouts," Dunn Tire, Posted Jul. 25, 2011, https://www.dunntire.com/blog/Extreme-heat-can-cause-tire-blowouts, Retrieved from the internet on Jun. 8, 2021.
(Continued)

*Primary Examiner* — Helal A Algahaim
*Assistant Examiner* — Merritt E Levy
(74) *Attorney, Agent, or Firm* — Shackelford, McKinley & Norton, LLP; Robert A. Voigt, Jr.

(57) ABSTRACT

Aspects of this disclosure include a method for proactive cooling, a vehicle, and a computer program product for a proactive cooling system. One embodiment of the method may comprise creating a machine learning model of a physical object, and instrumenting the physical object with sensors to generate real-time data about the physical object and its operational environment. The method may further comprise generating, with the machine learning model, a predicted future temperature for the physical object using the real-time data about the physical object and its operational environment, and in response to the predicted future temperature exceeding a threshold temperature within a threshold time period, proactively cooling the physical object.

20 Claims, 4 Drawing Sheets

(51) Int. Cl.
 *G01C 21/34* (2006.01)
 *G01C 21/36* (2006.01)
 *G06N 20/00* (2019.01)

(58) Field of Classification Search
 USPC .......................................................... 701/36
 See application file for complete search history.

(56) References Cited

U.S. PATENT DOCUMENTS

| | | | | |
|---|---|---|---|---|
| 2004/0050151 | A1* | 3/2004 | Kojima | B60C 23/20 |
| | | | | 73/146 |
| 2012/0139717 | A1 | 6/2012 | Cao | |
| 2013/0234847 | A1* | 9/2013 | Carson | B60C 23/20 |
| | | | | 340/449 |
| 2017/0361698 | A1 | 12/2017 | Hussain | |
| 2019/0315165 | A1 | 10/2019 | Delacroix | |
| 2019/0354922 | A1 | 11/2019 | Berti | |
| 2019/0391800 | A1 | 12/2019 | Lin | |
| 2020/0047568 | A1 | 2/2020 | Alhammadi | |
| 2020/0200824 | A1 | 6/2020 | Narayanaswami | |
| 2021/0061021 | A1* | 3/2021 | Singh | B60C 11/246 |
| 2021/0109837 | A1 | 4/2021 | Rakshit | |
| 2021/0180891 | A1* | 6/2021 | Rousselet | G05B 13/042 |
| 2021/0181737 | A1* | 6/2021 | Patnaik | B60W 60/0015 |
| 2021/0287459 | A1* | 9/2021 | Cella | G07C 5/0808 |
| 2021/0404827 | A1* | 12/2021 | Gloceri | H01M 10/613 |
| 2024/0035928 | A1* | 2/2024 | Dorfi | B60C 19/00 |
| 2024/0246373 | A1* | 7/2024 | Sams | B60W 40/12 |

FOREIGN PATENT DOCUMENTS

| | | | | |
|---|---|---|---|---|
| CN | 104842723 | B | 2/2017 | |
| CN | 107521330 | A | 12/2017 | |
| CN | 209290368 | U * | 8/2019 | ............... B60T 5/00 |
| CN | 110454290 | A | 11/2019 | |
| CN | 110618671 | A | 12/2019 | |
| CN | 211869086 | U * | 11/2020 | |
| CN | 113239963 | A | 8/2021 | |
| CN | 117980175 | A | 5/2024 | |
| DE | 112022003674 | T5 | 6/2024 | |
| GB | 2533470 | A | 12/2015 | |
| JP | S595605 | Y2 * | 2/1984 | |
| JP | 2017226392 | A | 12/2017 | |
| JP | 2021133814 | A * | 9/2021 | |
| JP | 2024-535183 | A | 9/2024 | |
| KR | 20140145761 | A * | 12/2014 | |
| KR | 101998176 | B1 * | 10/2019 | |
| WO | 2009025658 | A1 | 2/2009 | |
| WO | 20090256581 | W | 2/2009 | |
| WO | WO-2014092556 | A1 * | 6/2014 | ............... B62J 15/00 |
| WO | 2018084823 | A1 | 5/2018 | |
| WO | 2023/050957 | A1 | 4/2023 | |

OTHER PUBLICATIONS

"Temperature Changes in a Venturi Tube," https://physics.stackexchange.com/questions/298325/temperature-changes-in-a-venturi-tube, Retrieved from the internet on Jun. 8, 2021.

Andrew J. Zakrajsek and Shankar Mall, "The Development and use of a Digital Twin Model for Tire Touchdown Health Monitoring," AIAA 2017-0863, Session: Structural Health Monitoring and Prognosis, Model Uncertainty, Published Online:Jan. 5, 2017, https://doi.org/10.2514/6.2017-0863.

Ange Kongo-Kondé, Iulian Rosu, Frédéric Lebon, Olivier Brardo, Bernard Devésa. Thermomechanical analysis of an aircraft tire in comering using coupled ale and lagrangian formulations. Central European, Journal of Engineering, 2013, 3 (2), pp. 191-205., 10.2478/s13531-012-0049-6., hal-00833555.

Caleb Holloway, "White Paper: Influence of Temperature on Tire Grip," http://www.izzeracing.com/products/ewExternalFiles/Izze_Racing_White_Paper_Tire_Temperature.pdf.

Computer simulation gives us a competitive edge, Jun. 9, 2021, https://www.michelin.com/en/news/computer-simulation-gives-us-a-competitive-edge/, Retrieved from the Internet on Jun. 8, 2021.

David Emmett, "Those Ducati Winglets: What Are They Really For?" Aug. 2, 2010, https://motomatters.com/opinion/2010/08/02/those_ducati_winglets_what_are_they_real.html, Retrieved from the internet on Jun. 8, 2021.

Diwakar Harsh and Barys Shyrokau, Tire Model with Temperature Effects for Formula SAE Vehicle, Published: Dec. 6, 2019, https://www.mdpi.com/2076-3417/9/24/5328, Retrieved from the internet on Jun. 8, 2021.

Ducati's controversial new MotoGP part explained, Mar. 12, 2019, https://www.youtube.com/watch?v=cJa23qVMVEQ, Retrieved from the internet on Jun. 8, 2021.

James Klein, "MotoGP's Aldridge defends Ducati winglet ruling," published Mar. 29, 2019, https://www.motorsport.com/motogp/news/aldridge-defends-ducati-winglet-ruling/4360893/, Retrieved from the internet on Jun. 8, 2021.

Mercedes-Benz patents water-cooling system for car tires, Jake Holmes, Could Water be used to keep car tires at the correct temperature?, Published Jun. 29, 2016, https://www.motor1.com/news/64538/mercedes-benz-patents-water-cooling-system-for-car-tires/, Retrieved from the internet on Jun. 8, 2021.

Rathnavel P, Baldwin Immanuel, Rayavel P, Road Tyre Friction Used to Generation of Electrification, International Journal of Engineering and Advanced Technology (IJEAT) ISSN: 2249-8958, vol. 9, Issue-2, Dec. 2019, https://www.ijeat.org/wp-content/uploads/papers/v912/84956129219.pdf.

Samuel K. Clark, Richard N. Dodge, Heat generation in aircraft tires, Computers & Structures, vol. 20, Issues 1-3, 1985, pp. 535-544, ISSN 0045-7949, https://doi.org/10.1016/0045-7949(85)90101-4. (https://www.sciencedirect.com/science/article/pii/0045794985901014).

International Search Report and Written opinion dated Sep. 28, 2022 from International Application No. PCT/CN2022/103562 filed Jul. 14, 2022.

* cited by examiner

PROACTIVE COOLING SYSTEM

BACKGROUND

The present disclosure relates to cooling systems, and more specifically, to proactive cooling using digital twin simulation.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of these capabilities has been in computerized management and control systems. Some advanced systems, such as automobiles, contain an array of on-board sensors that record information about the system. The resulting data has been used to optimize performance of the vehicle's major sub-components.

SUMMARY

According to embodiments of the present disclosure, a method for proactive cooling, comprising creating a machine learning model of a physical object, and instrumenting the physical object with sensors to generate real-time data about the physical object and its operational environment. The method may further comprise generating, with the machine learning model, a predicted future temperature for the physical object using the real-time data about the physical object and its operational environment, and in response to the predicted future temperature exceeding a threshold temperature within a threshold time period, proactively cooling the physical object.

According to embodiments of the present disclosure, a vehicle, comprising a wheel assembly, a plurality of sensors that generate real-time data about the wheel assembly and its operational environment, a processor, and a memory coupled to the processor. The memory may contain program instructions executable by a processor to cause the processor to generate, with a digital twin model of the wheel assembly, a predicted future temperature for the wheel assembly using the real-time data about the physical object and its operational environment, and in response to the predicted future temperature exceeding a threshold temperature within a threshold time period, proactively cooling the wheel assembly.

According to embodiments of the present disclosure, a computer program product for a proactive cooling system, the computer program product comprising a computer readable storage medium having program instructions embodied therewith. The program instructions may be executable by a processor to cause the processor to receive data from a plurality of sensors associated with a physical object, wherein the plurality of sensors generate real-time data about the physical object and its operational environment and generate, with a digital twin model of the physical object, a predicted future temperature for the physical object using the real-time data about the physical object and its operational environment. The program instructions may be executable by a processor to further cause the processor to, in response to the predicted future temperature exceeding a threshold temperature within a threshold time period, proactively cool the physical object.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to cooling systems; more particular aspects relate to proactive cooling using digital twin simulation. While the present disclosure is not necessarily limited to such applications, various aspects of the disclosure may be appreciated through a discussion of various examples using this context.

Many safety experts encourage drivers to be aware of the current temperatures of their wheel assemblies (e.g., tires and brakes), especially during extended travel in hot weather. High ambient temperatures, the type of surface on which a vehicle is running (e.g., asphalt, gravel, concrete, etc.), high-speed driving, aggressive cornering, and frequent braking (e.g., mountain driving) may all cause a vehicle's tires and brakes to heat up beyond their design ratings. Data has shown that the corresponding increased tire pressures and/or thermal degradation of the tire/brakes can increase the risk of blowouts and other catastrophic failures.

Accordingly, some embodiments of this disclosure may provide for improved thermal management of a vehicle's tires, which may help reduce the chance of heat damage, including blowouts. Additionally or alternatively, some embodiments may provide for improved thermal management of a vehicle's brake assemblies (e.g., disks, pads, etc.), which may help maintain stopping performance under heavy load and increase safety.

Some embodiments may include a digital twin simulation that uses internet-of-things (IoT) sensors to calculate how much thermal energy will be received in and/or generated by a vehicle's tires and/or brakes, and in response to a predicted temperature greater than a threshold, proactively enable a venturi effect-based air cooling system. This proactive application of cooling may help maintain tire/brake temperatures under the specified threshold, thereby increasing safety and reducing the vehicle's total cost of operation. In some embodiments, heat flux into the tires and/or heat generated by the tires can be captured by a storage and conversion device into mechanical or electrical energy and re-used for powering some of these IoT sensors.

Some embodiments may be particularly desirable for use on high performance and/or heavily loaded vehicles, such as race cars, medium and heavy duty trucks, and trailers, as these types of vehicle may often put more load on their tires and brakes operation. Proactive cooling may enable these vehicles to more effectively use limited cooling capacity to maintain the tires/brakes below the threshold temperature. Some embodiments may be particularly desirable for use during long events and/or routes, as their venturi effect-based cooling system does not require the use of consumables, such as water. That is, some embodiments may utilize a consumable-free cooling system.

In some embodiments, the digital twin simulation may use real-time data from a plurality of IoT sensors located on their real-life twin and/or in its operational environment. For example, the digital twin simulation model in some embodiments may utilize: a. weather parameters (rainy, windy, hot, etc.); b. road parameters (types of road, level of friction between tire and road, material used in the road, etc.); c. number of actual or expected turns per unit time based on a predicted route; d. travel parameters (distance already traveled, types of road, speed of vehicle, continuous use mode, etc.); e. vehicle parameters (problems with bearing, types of brakes, brake condition, etc.); and f. tire parameters (diameter, width, condition of tire, pressure, surface area touched on the road etc.) The resulting data may be used in the digital twin model to predict whether or not a future temperature of vehicle tire/brake will exceed the predetermined threshold (e.g., a temperature above which the tire and/or to the vehicle have an increased risk of damage that may lead to a blowout event) in the near future. In response to such a prediction, some embodiments may selectively and proactively enable a venturi effect-based air cooling system to direct cooled air against the tire/brake assembly. This proactive cooling of specific vehicle tires/brakes may help maintain the physical stability of those tires/brakes.

In some embodiments, the digital twin model may further simulate the amount of heat flux into and/or heat generation in each vehicle tire/brake, and in response, dynamically adjust an amount of cooling applied to that tire/brake (e.g., by controlling a size of an inlet opening, a number of air jets open, etc.) These embodiments may be desirable because the pressure drop of the air through the venturi may depend on the speed of the vehicle, and at the same time, heat generation on the vehicle wheel may depend on the speed of the vehicle.

In some embodiments, the digital twin model may include simulating the location(s) where specific measurements are collected on its real life twin and/or its predicted operating environment. This may include future conditions, such as predicted road conditions, ambient climatic conditions, speed, number of bends/curves, vehicle load, etc., and then identify a timing and a context in which to invoke the air jets for optimal cooling effect. The digital twin model may then continuously recalculate whether and how long the cooling is to be applied to each vehicle tire/brake based on a current context identified for the vehicle, and accordingly, some embodiments may also dynamically decide when the venturi effect-based cooling should be reduced and/or stopped. These embodiments may be desirable to reduce drag when the cooling is not required.

In some embodiments, an array of venturi tunnels may be installed into a front surface of a vehicle to increase the inlet pressure and/or rate of airflow entering the venturi's throat. The entrances to these tunnels may be selectively partially blocked and/or the effective diameter of the venturi throats may be selectively changed. In this way, the amount of available cooling power may be controlled as a function of a current speed of the vehicle, a number jets currently open, and/or a ratio between the current inlet and minimum diameter of the venturi tunnel. In some embodiments, the cooled air jet may be tangentially applied on the tires/brakes. Additionally, for embodiments that cool the tires, the cooled air jet may be tangentially applied below the center of rotation of the tire such that the resulting jet does not add significant additional air resistance to tire's rotation.

In some embodiments, the digital twin model may be trained using historical heat generation patterns and cooling effect patterns versus speed for a particular vehicle, driver, and set of ambient conditions. Once a sufficient level of accuracy is met, then some embodiments may calculate a customized cooling plan (e.g., duration and/or timing) for that specific combination of inputs. In some embodiments, this may further include predicting a driver's route to a destination and then obtaining information about the operating conditions along that predicted route. In some embodiments, the digital twin model may also identify changes the patterns over time, and in response, proactively recommend maintenance of the tire/brake.

Some embodiments may display the current thermal parameters of the tire/brake to a driver of the vehicle before and/or after activating the cooling system. These embodiments may be desirable to promote driver confidence, particularly when used in situations where higher performance is required. Some embodiments may additionally calculate and display a tire vulnerability score based on the rate at the which the heating and jet cooling is applied, and in response to a score above a predetermined threshold, notify the driver to stop driving and/or seek immediate maintenance.

Figure 1:
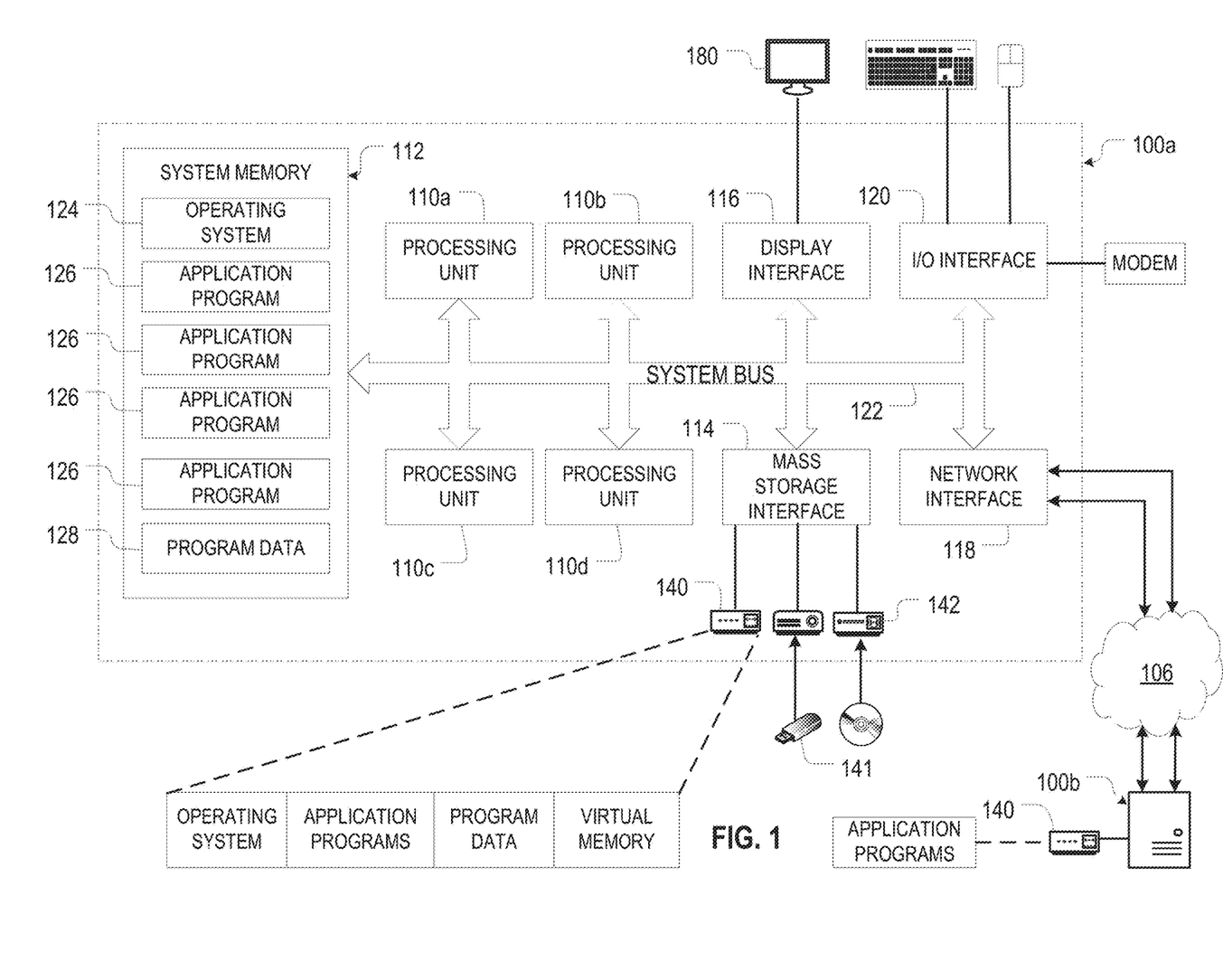
FIG. 1 illustrates one embodiment of a data processing system (DPS), consistent with some embodiments.

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The data processing system 100 in FIG. 1 may comprise a plurality of central processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140 or a readable/writable optical disk drive 142. The network interfaces 118 may allow the DPS 100a to communicate with other DPS 100b over the network 106. The main memory 112 may also contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the computing systems 100 may only comprise a single processor system and/or a single processor designed to emulate a multiprocessor system. Further, the processor(s) 110 may be implemented using a number of heterogeneous data processing systems 100 in which a main processor 110 is present with secondary processors on a single chip. As another illustrative example, the processor(s) 110 may be a symmetric multiprocessor system containing multiple processors 110 of the same type.

When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage devices 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 116 may be used to directly connect one or more displays 180 to the data processing system 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the computer systems 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Figure 2A:
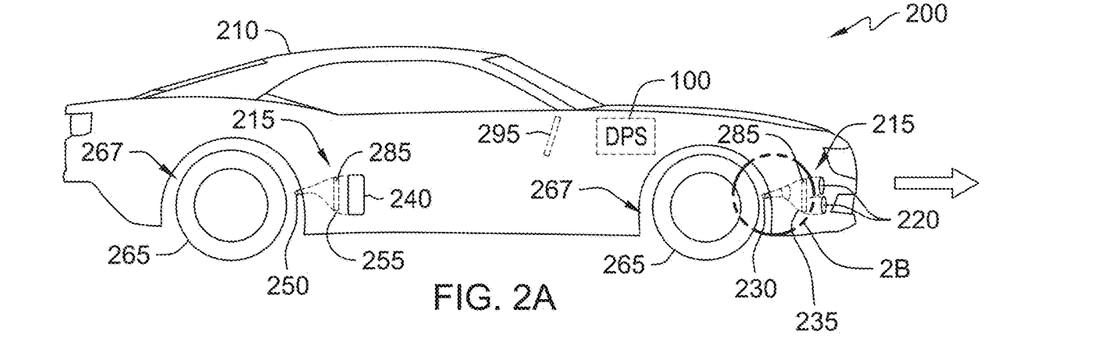
FIG. 2A is a side view of a vehicle having a cooling system, consistent with some embodiments.
Figure 2B:
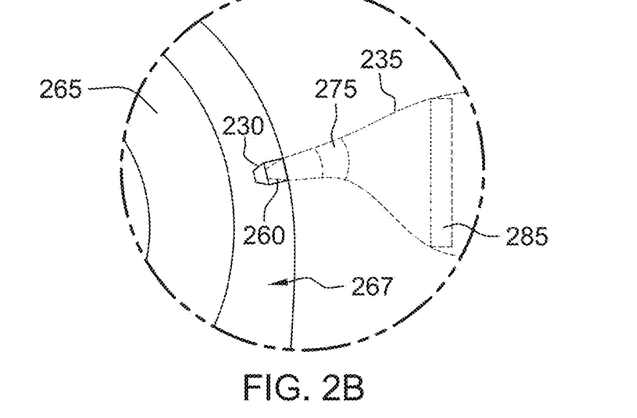
FIG. 2B is a side view showing portions of the cooling system in FIG. 2A.
Figure 2C:
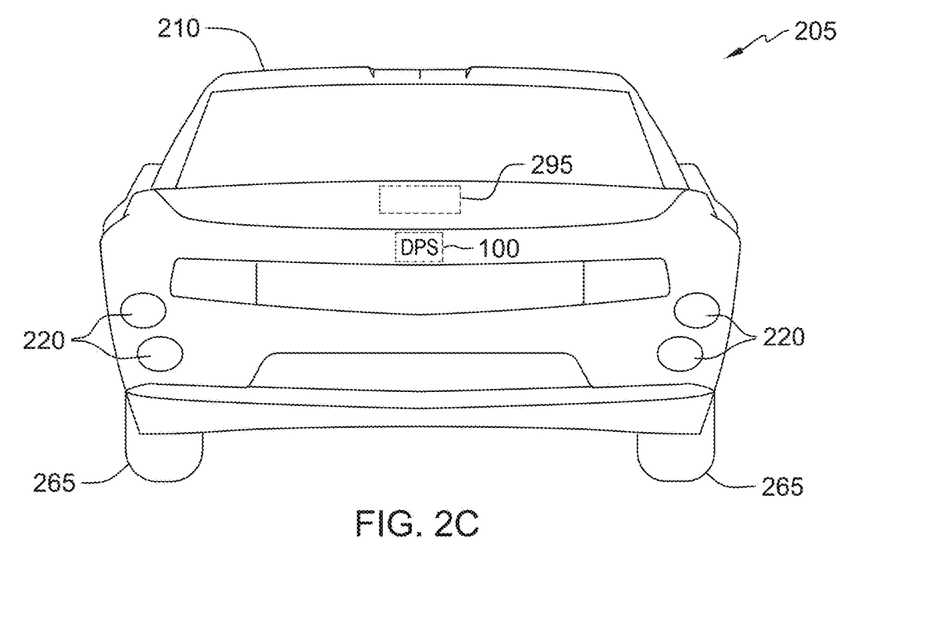
FIG. 2C is a front view of a vehicle having a cooling system, consistent with some embodiments.

FIGS. 2A and 2C are side 200 and front 205 views of a vehicle 210 having a cooling system 215, consistent with some embodiments. FIG. 2B is a side view showing portions of the cooling system in FIG. 2A. This embodiment is described with respect to cooling the vehicle's tires 265. However, systems that cool the brakes are also within the scope of this disclosure.

The cooling system 215 in FIGS. 2A-2C may comprise an array of front inlets 220 arranged on a front/leading surface of the vehicle 210. The front inlets 220 may each be fluidly connected to one or more front nozzles 230 by front air ducts 235. The cooling system 215 may also include an array of side inlets 240 fluidly connected to one or more rear nozzles 250 by rear air ducts 255. Alternatively, the rear nozzles may also be fluidly connected to the front inlets 220.

As best shown in FIG. 2B, the nozzles 230, 250 may have a controllable exit aperture 260 that may be partially opened and closed to allow for adjustment of a pressure drop of the air as it exits the ducts 235, 255 against one of the vehicle's tires 265. This exit aperture 260 may function as the throat of a venturi tube. Each duct 235, 255 may also include an inlet aperture 285 that may be selectively opened and closed to control an amount of air entering into the ducts 235, 255. The cooling system 215 may also include a driver information panel 295 that can display status information about the vehicle's tires 265 and the cooling system 215.

In operation, the air ducts 235, 255 may direct air from the inlets 220, 240 to the nozzles 230, 250. The nozzles 230, 250, in turn, may both speed up the air and direct it against one of the vehicle's tires 265. In some embodiments, the air entering the nozzles 230, 250 may be at a relatively higher static pressure by virtue of the forward movement of the vehicle 210. The nozzles 230, 250 may cause that air to speed up, which may cause a corresponding decrease in the pressure and temperature of the air. In some embodiment, the nozzles 230, 250 may be located adjacent to, or even partially within, a wheel well 267 containing the tire 265. These embodiments may be desirable because the air velocity just outside the nozzles 230, 250 may remain elevated and, as a result, the corresponding temperature of the air applied to the tire 265 may remain relatively lower.

Some embodiments may further enhance the venturi effect by adding an intercooler 275 upstream of the nozzles 230, 250. This intercooler 275 may cool the incoming air (which may be at static pressure) back down toward ambient temperature, which may then be further reduced by the pressure drop in the nozzles 230, 250. That is, the intercooler 275 and/or nozzle 230/250 and may act as a condenser and throttling valve, respectively. In some embodiments, the intercooler 275 and nozzles 230, 250 may have smoothly curved surfaces to allow air to smoothly pass through, thereby increasing the cooling power of the system 215.

The cooling system 215 in some embodiments may continuously gather data on tire heating rate, tire temperature, time required for cooling, and vehicle speed using a plurality of sensors (e.g., Internet of Things (IoT) sensors) 290 and/or by querying or more external data sources, such as an Internet-accessible weather service. Some embodiments may apply this historical data to train a machine learning (ML) model executing on an on-board vehicle DPS 100 to estimate the effectiveness of the cooling system 215 with respect to each individual tire 265. In this way, some cooling system 215 embodiments may create a customized ML model for this specific vehicle 210 as driven by a specific driver under a variety of different environmental conditions.

In some embodiments, the resulting trained ML model may be used to proactively open or close the apertures 260, 285. That is, some embodiments may anticipate that cooling will be needed in the near-future based on current ambient conditions, the expected route, the driver's style of driving, etc., and then begin applying cooling to the tires 265 before those tires reach a predetermined critical temperature. In this way, some embodiments may increase the effective cooling power of the cooling system 215. These embodiments may be also desirable because the ML model may selectively maintain the apertures 285 in a closed position when not needed to reduce drag on the vehicle 210, and then selectively open the apertures 285 if the system 215 anticipates that cooling will be needed soon. In some embodiments, the above may include proactively calculating both a timing of and duration for opening of the apertures 260, 285.

In some embodiments, the creating the ML model may include creating a digital twin model of vehicle 210 and/or the vehicle's 210 tires 265 in the on-board DPS 100, then simulating any cooling needs and the effects of any applied cooling. A digital twin model, in turn, generally refers to a virtual representation of a physical object, system, or other object. The digital twin in the model tracks changes to the physical object, system or object across the object's lifespan and records the changes as they occur. Internet-of-things (IoT) sensors may instrument the physical object to collect data, often in real-time. The collected data may then be mapped to the digital model. In this way, any individual or system with access to the digital twin can see the real-time information about the physical object operating in the real world without having to be physically present and viewing the physical object while operating. For example, drivers can use the digital twin to understand not only how the tires and/or brakes are performing, and to predict how those objects may perform in the future, using the collected data from sensors, IoT devices and other sources of data.

The modeled physical object may have a set of physical and non-physical attributes (also be referred to as properties and features). The modeled physical attributes may have states, and these states may undergo change across a dimension, such as time. In an embodiment, the physical attributes of a modeled physical object may include material composition of the physical object and its individual components (to varying degrees of granularity); the physical arrangements or configurations of the physical object relative to other physical objects; the physical arrangements or configurations of components of the physical object relative to one another or relative to its operational environment.

The non-physical attributes of a modeled physical object may include information that describes the physical object and its physical attributes; a context of the physical object relative to other physical objects or entities; and information that describes the states of the physical object's attributes and the changes in those states over time. Two or more changes to states of the non-physical attributes of the physical object may also be part of the experiences or the history of the physical object. In an embodiment, the context of the physical object (a non-physical attribute of the physical object) may include information that defines the physical object relative to other physical objects or entities.

Accordingly, in an embodiment, a digital twin model stores and tracks information about physical and non-physical attributes the vehicle 210, the cooling system 215, and/or tires 265; the context of each such object relative to the other physical objects; and real-time information that describes the state of each object's attributes and the changes in those states over time. Non-limiting examples of the context data stored may include: a current measured temperature of the tire 265, a current measured temperature of the air, a current measured temperature of a road surface, a type of road surface, maintenance plans; maintenance history; part replacement history; tire usage history; tire specifications; 3-dimensional model and CAD drawing data for the tire; fault codes from one or more vehicle control systems; scheduled maintenance plans; operating manuals; usage data, artificial intelligence (AI) and state prediction data; operating history; ownership; and ownership change history. Each such type of context data may also have associated change information. Non-limiting examples of the attributes may include: an inspection history, a maintenance history; a part replacement history; a part usage history; specifications; 3-dimensional model and CAD drawing data; fault codes; scheduled maintenance plans; operating manuals; usage data, such as real time sensor readings associated with the physical object; artificial intelligence (AI) and state prediction data; operating history; ownership; and ownership change history. Each such type of attribute data may also have associated change information.

In an embodiment, the digital twin may be created at the same time as the physical object with similar base features as the initial physical object. In another embodiment, the digital twin may be created at a different time than the physical object (for example, when installed on a particular vehicle 210). In an embodiment, the digital twin may be created via a preconfigured data representation of a tire 265. Regardless of when the digital twin and its associated physical object are created, the two may be linked. Linking a digital twin and a corresponding physical object may include, for example, a process by which a data record including or representing the digital twin is modified to refer to unique identifying information of the physical object.

In some embodiments, creating the digital twin generally refers to a computer-implemented process (implemented by executing programming instructions using a DPS 100) by which a digital record comprising the digital twin is created on a non-transitory tangible storage device. In an embodiment, the storage device may be physically coupled to object, e.g., the tire 265 which the digital twin tracks, and then digitally transferred to a digital twin simulation engine physically located on the vehicle 210. In another embodiment, the storage device is decoupled from the physical object. In a related embodiment, the storage device and/or digital twin simulation engine may be components in a cloud-computing infrastructure available in distributed networks and systems, such as the internet.

Figure 3A:
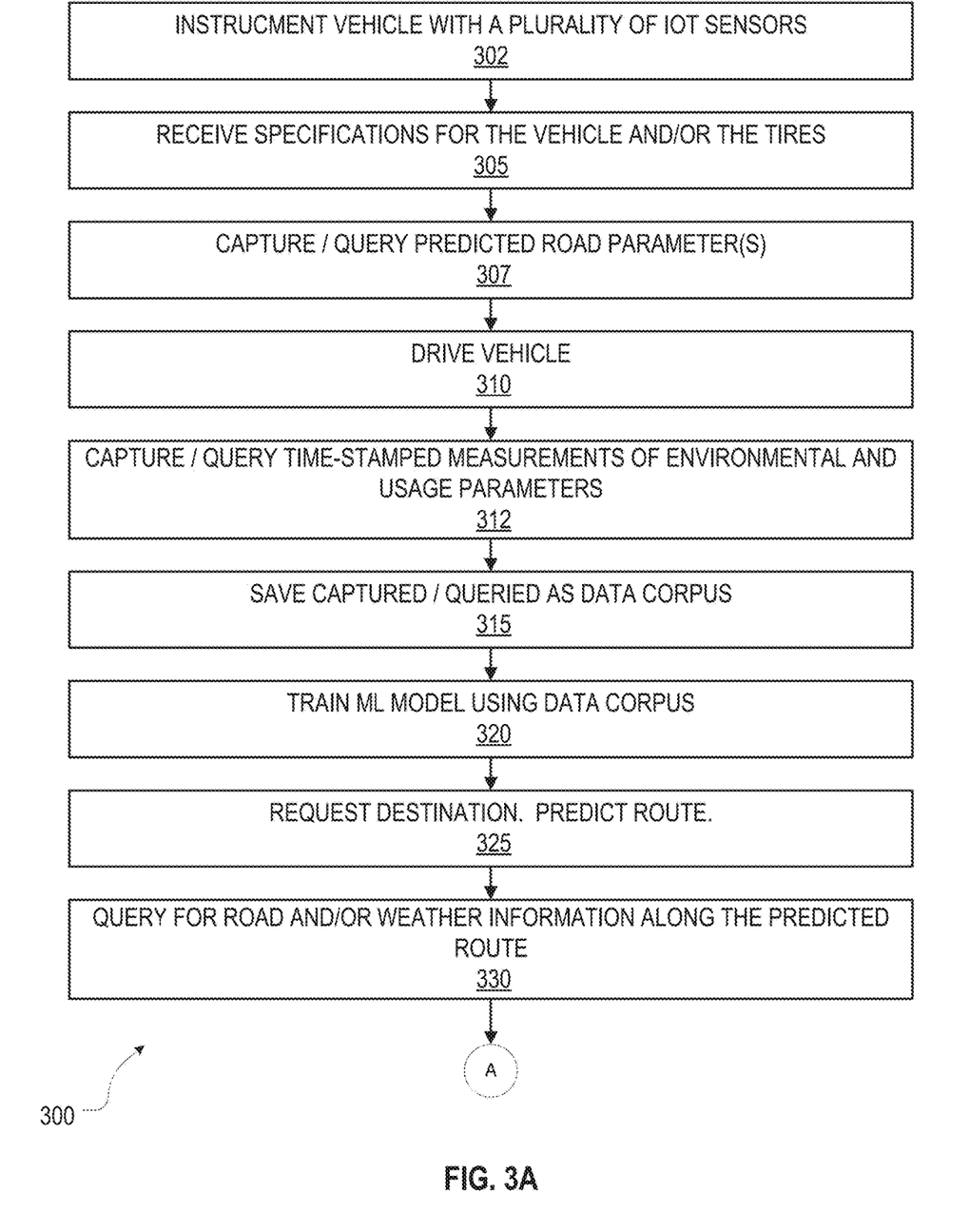
FIGS. 3A-3B are a flow chart showing one method for operating a cooling system, consistent with some embodiments.
Figure 3B:
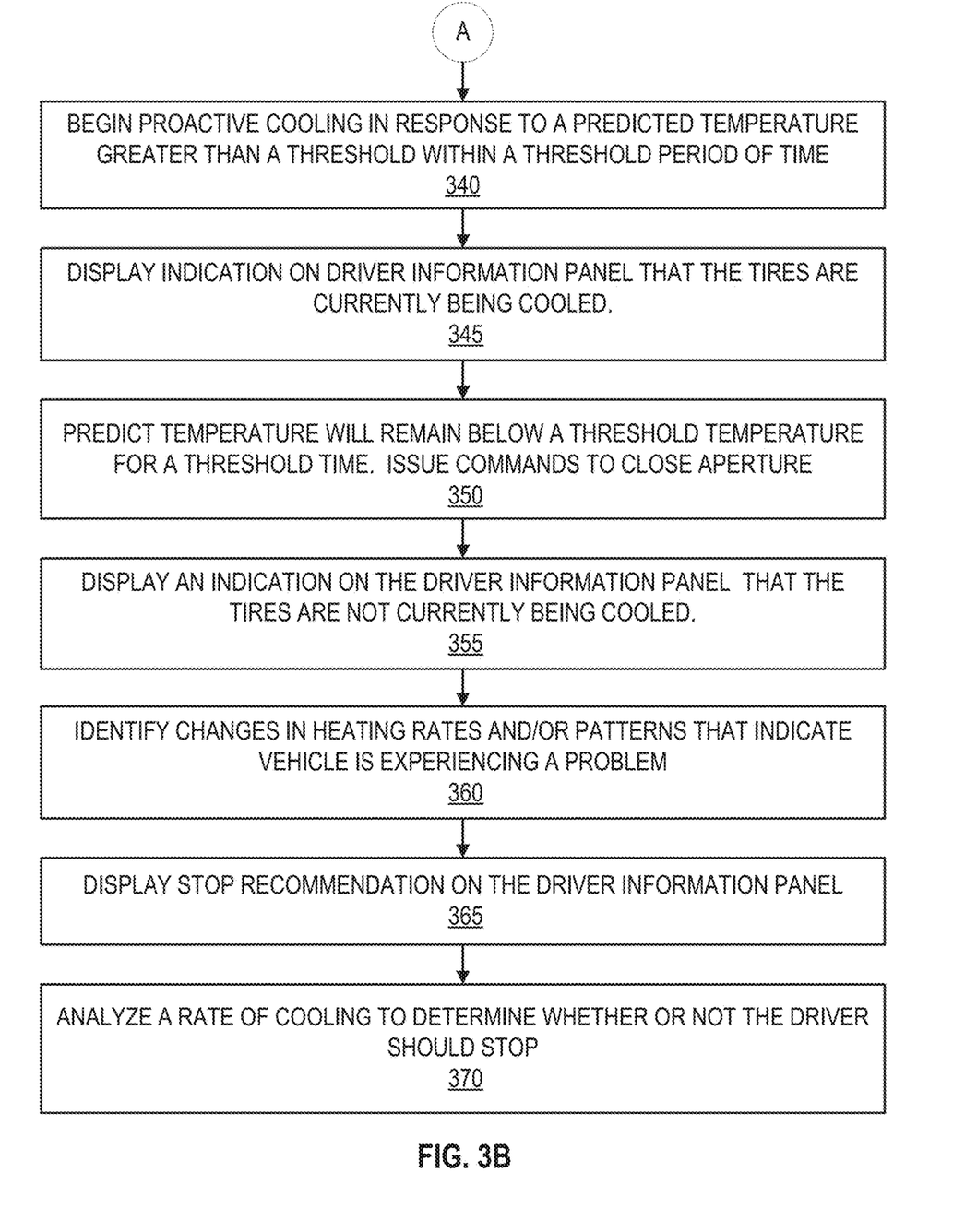

FIGS. 3A-3B are a flow chart showing one method 300 for operating a cooling system, consistent with some embodiments. At operation 302, a vehicle 210 may be instrumented with a plurality of IoT sensors 290. Next, at operation 305, the ML model may receive specifications for the vehicle 210 and/or the tires 265, such as wheel diameter, width of the tire, types of tire (e.g., tube, tube-less), types of material used in the tire, measured coefficient of friction with various road surface types, etc. Predicted road parameter(s) may be captured and/or queried at operation 307 based on a desired route provided the driver, e.g., via a map application displayed in the driver information panel, queried against an internet accessible computer database associated with the local transportation system, etc. The current weather conditions may also be detected by sensors on the vehicle 210 and/or queried using one of a plurality of weather services on the Internet at operation 307. Predicted future weather parameters may also be queried at operation 307 using the combination of the predicted route information and the weather services.

The driver may then begin driving the vehicle 210 at block 310. In response, the IoT sensors 290 may begin capturing time-stamped temperature readings for each vehicle tire 265 at operation 312. Some embodiments may also capture and/or query time-stamped measurements of various environmental and usage parameters, such current road parameters, predicted road parameters, vehicle parameters, weather parameters, travel parameters etc. at operation 312.

In some embodiments, the cooling system 215 may save the sensed and/or queried data to use as a historical data corpus at operation 315. This historical data corpus, in turn, may be used at operation 320 to train the ML model to calculate a prediction about the heating pattern of specific vehicle tires 265 on this specific vehicle 210 as driven by this specific driver. This training operation may include using the ML model predict a temperature of the tires 265 then comparing the prediction to actual measured results to produce a gradient value. The gradient value, in turn, may be used to adjust one or more parameters of the ML model. In embodiments using digital twin models, operation 320 may include using the current temperature of the vehicle tire, speed of vehicle, distance already traveled, route followed, braking frequency, etc.

After the ML model has been trained to a sufficient level of accuracy, normal operation may begin. At operation 325, the ML model may ask the driver to enter their destination, and may then predict a route based on the destination. At operation 330, the ML model may query one or more data sources for road and/or weather information along the predicted route. At operation 335, the ML model may begin predicting a future temperature of each of the vehicle's tires 265.

At operation 340, the ML model may begin proactive cooling in response to a predicted temperature greater than a threshold within a threshold period of time (e.g., a predicted temperature of one of the tires 265 temperature will exceed a specified maximum operational temperature). This may include directing the opening of selected front aperture(s) 285 to the ducts 235, 255, which may allow a desired amount of air to begin flowing through the intercooler 275 and the nozzles 230, 250, and onto the vehicle tire(s) 265. In some embodiments, the nozzles 230, 250 may direct this air flow tangentially towards the tire's 265 circumference below the tire's center of rotation. In this way, the direction air flow of the jet may be aligned opposite direction of wheel rotation, which may be desirable to reduce drag force on the tire 265, and thus, on the vehicle 210. Additionally or alternatively, the ML model may control aperture 260 open or close, thereby changing the velocity (and thus, exit temperature) of the air jet hitting the tire 265. At operation 345, the cooling system 215 may display an indication on the driver information panel 295 that the tires 265 are currently being cooled.

At operation 350, the ML model may predict that a tire's 265 temperature will remain below a threshold temperature for a threshold time, and in response, issue commands that will close the apertures 285 to reduce drag forces on the vehicle 210. At operation 355, the cooling system 215 may display an indication on the driver information panel 295 that the tires are not currently being cooled.

Optionally, some embodiments may analyze the historical and current data at operation 360 to identify changes in heating rates and/or patterns that may indicate that vehicle 210 is experiencing a mechanical problem, especially with respect to one or more of the wheels, such as a bearing that generating heat. If a potential problem is identified, then the cooling system 215 may display an indication on the driver information panel 295 at operation 365. Additionally, some embodiments may analyze a rate of cooling to determine whether or not to recommend that the driver stop at operation 370, e.g., due to a predicted critical future condition. This operation 370 may include analyzing the expected future heat flux and heat generation in an upcoming portion of the predicted route.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A method for proactive cooling, comprising:
   creating a machine learning model of a physical object;
   instrumenting the physical object with sensors to generate real-time data about the physical object and its operational environment;
   generating, with the machine learning model, a predicted future temperature for the physical object using the real-time data about the physical object and its operational environment; and
   in response to the predicted future temperature exceeding a threshold temperature within a threshold time period, proactively cooling the physical object.

2. The method of claim 1, wherein the physical object comprises a tire for a vehicle.

3. The method of claim 1, further comprising:
   receiving a destination from a driver of the vehicle; and
   calculating a route to the destination, wherein the real-time data includes a future weather parameter along the route and a future road parameter along the route.

4. The method of claim 3, wherein the real-time data further includes a number of turns in a segment of the route.

5. The method of claim 2, wherein creating the machine learning model comprises creating a digital twin model of the tire, wherein:
   the digital twin model simulates heat flux into the tire and heat generated by the tire; and
   the threshold temperature is a temperature at which the tire will be at risk of damage.

6. The method of claim 5, further comprising, in response to the digital twin model predicting a future temperature above a temperature at which the tire will be damaged, proactively enabling a venturi effect-based air jet cooling system against the tire, wherein the proactive cooling provides thermal stability of the tire.

7. The method of claim 6, wherein proactively enabling the venturi effect-based air jet cooling system comprises opening an aperture to increase an amount air flowing through the venturi effect-based air jet cooling system.

8. The method of claim 7, wherein the venturi effect-based air jet cooling system is directed tangentially to the tire below a center of rotation.

9. The method of claim 7, further comprising calculating, by the digital twin model, how long the venturi effect-based cooling system is to be applied to the tire, and in response, closing the aperture.

10. The method of claim 9, wherein calculating how long the venturi effect-based cooling system is active is based at least in part on a current speed of the vehicle.

11. The method of claim 6, wherein proactively enabling the venturi effect-based air jet cooling system comprises dynamically increasing a number of jets in the venturi effect-based air jet cooling system applying cooling to the tire.

12. The method of claim 6, wherein the venturi effect-based air jet cooling system comprises an array of venturi tunnels in front of the vehicle.

13. The method of claim 3, further comprising displaying a thermal parameter of the tire to the driver before and after proactively cooling the physical object.

14. The method of claim 13, further comprising recommending that the driver stop based on a current temperature of the tire and a rate at which the tire is heating.

15. The method of claim 13, further comprising recommending proactive maintenance based on a change in a pattern of the thermal parameter of the tire.

16. The method of claim 2, wherein proactively cooling the tire of the vehicle comprises activating a consumable-free cooling system.

17. The method of claim 1, wherein the physical object comprises a brake assembly for a vehicle.

18. A vehicle, comprising:
   a wheel assembly;
   a plurality of sensors that generate real-time data about the wheel assembly and its operational environment;
   a processor; and
   a memory coupled to the processor, wherein the memory contains program instructions executable by the processor to cause the processor to:
      generate, with a digital twin model of the wheel assembly, a predicted future temperature for the wheel assembly using the real-time data about the wheel assembly and its operational environment; and
      in response to the predicted future temperature exceeding a threshold temperature within a threshold time period, proactively cooling the wheel assembly.

19. The vehicle of claim 18, wherein proactively cooling the wheel assembly comprises selectably enabling a venturi effect-based air jet cooling system to direct cooled air against the wheel assembly.

20. A computer program product for a proactive cooling system, the computer program product comprising a computer readable storage medium having program instructions embodied therewith, the program instructions executable by a processor to cause the processor to:
   receive data from a plurality of sensors associated with a physical object, wherein the plurality of sensors generate real-time data about the physical object and its operational environment;
   generate, with a digital twin model of the physical object, a predicted future temperature for the physical object using the real-time data about the physical object and its operational environment; and in response to the predicted future temperature exceeding a threshold temperature within a threshold time period, proactively cool the physical object.

\* \* \* \* \*